(12) United States Patent
Wang et al.

(10) Patent No.: US 10,627,676 B2
(45) Date of Patent: Apr. 21, 2020

(54) TRANSPARENT DISPLAY DEVICE AND TRANSPARENT EXHIBITION APPARATUS HAVING THE SAME

(71) Applicant: BOE Technology Group Co., Ltd., Beijing (CN)

(72) Inventors: Zifeng Wang, Beijing (CN); Yan Ren, Beijing (CN); Lei Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 260 days.

(21) Appl. No.: 15/789,258

(22) Filed: Oct. 20, 2017

(65) Prior Publication Data

US 2018/0275464 A1     Sep. 27, 2018

(30) Foreign Application Priority Data

Mar. 27, 2017   (CN) .................... 2017 2 0309861 U

(51) Int. Cl.
*G02F 1/1335*       (2006.01)
*G02F 1/13357*      (2006.01)
(Continued)

(52) U.S. Cl.
CPC ........ *G02F 1/133615* (2013.01); *A47F 3/001* (2013.01); *A47F 3/005* (2013.01);
(Continued)

(58) Field of Classification Search
CPC ......... G02F 1/133615; G02F 1/133308; G02F 2001/13332; G02F 2001/133314; G02F 2201/46; G02F 1/133512; G02F 2203/01; G02F 2202/28; A47F 11/10; A47F 3/001; A47F 3/005; A47B 2220/0077
See application file for complete search history.

(56) References Cited

U.S. PATENT DOCUMENTS

2016/0238774 A1*   8/2016   Koike ................. G02B 6/0043
2016/0349435 A1*  12/2016   Hsiao .................... G02F 1/1335

FOREIGN PATENT DOCUMENTS

KR         20150047191 A   *   5/2015

OTHER PUBLICATIONS

Machine English Translation of KR20150047191A; Park Ki Duck (Year: 2015).*

* cited by examiner

*Primary Examiner* — Andrew J Coughlin
*Assistant Examiner* — Glenn D Zimmerman
(74) *Attorney, Agent, or Firm* — Westman, Champlin & Koehler, P.A.

(57) ABSTRACT

A transparent display device and a transparent exhibition apparatus including the transparent display device are disclosed. The transparent display device includes: a transparent display panel, an edge region thereof being fixed between a first frame and a second frame, a transparent display region of the transparent display panel being exposed from openings of the first and second frames provided at central regions thereof; a LED light bar disposed at a lateral side of the transparent display panel; and an optical structure disposed between the lateral side of the transparent display panel and the LED light bar, the optical structure including an optical component configured to uniform light emitted by the LED light bar towards the lateral side of the transparent display panel.

18 Claims, 7 Drawing Sheets

(51) Int. Cl.
*G02F 1/1333* (2006.01)
*A47F 3/00* (2006.01)
*A47F 11/10* (2006.01)

(52) U.S. Cl.
CPC ........ *A47F 11/10* (2013.01); *G02F 1/133308* (2013.01); *A47B 2220/0077* (2013.01); *G02F 1/133512* (2013.01); *G02F 2001/13332* (2013.01); *G02F 2001/133314* (2013.01); *G02F 2201/46* (2013.01); *G02F 2202/28* (2013.01); *G02F 2203/01* (2013.01)

DRAWINGS

TRANSPARENT DISPLAY DEVICE AND TRANSPARENT EXHIBITION APPARATUS HAVING THE SAME

CROSS-REFERENCE TO RELATED APPLICATION

This application claims the benefits of Chinese Patent Application No. 201720309861.7 filed on Mar. 27, 2017 in the State Intellectual Property Office of China, a whole disclosure of which is incorporated herein by reference.

TECHNICAL FIELD

The present disclosure relates to the field of display technology, and particularly to a transparent display device and a transparent exhibition apparatus having the transparent display device.

BACKGROUND

A transparent exhibition apparatus comprises a transparent display device and an exhibition device, the transparent display device comprises a transparent display panel and a light source assembly disposed at a lateral side of the transparent display panel, the transparent display panel is disposed in front of the exhibition device, an exhibit may be disposed on the exhibition device, such that an observer can see the exhibit through a transparent display region of the transparent display panel. Transparent display panel may display information relating to the exhibit. Such display technology has been widely used in showcase exhibitions, exhibition booths, windshields of a vehicles and the like.

In an existing transparent display device, a transparent liquid crystal display panel is usually used as the transparent display panel and fixedly mounted between a front frame and a rear frame of the light source assembly, and a light-emitting diode (LED) light bar is provided as a backlight source of the transparent display device and disposed at a lateral side of the transparent display panel, such that light is transmitted into the transparent display panel through the side surface of the transparent display panel.

However, currently existing problems includes non-uniform distribution of light transmitted through the side surface of the transparent display panel due to imperfect matching between sizes of the LED light bar and transparent display panel and non-alignment between positions of the LED light bar and transparent display panel, which leads to a relative bad uniformity of light intensity when the transparent display panel displays, and display effect of the transparent display panel is thereby adversely affected.

SUMMARY

According to an aspect of the present disclosure, there is provided a transparent display device.

In an exemplary embodiment, the transparent display device may comprise: a first frame; a second frame; a transparent display panel, an edge region of the transparent display panel being fixed between the first frame and the second frame, each of the first frame and the second frame being provided with an opening at a central region thereof, such that a transparent display region of the transparent display panel is exposed from the opening of the first frame and the opening of the second frame; a LED light bar disposed at a lateral side of the transparent display panel; and an optical structure disposed between the lateral side of the transparent display panel and the LED light bar. The optical structure comprises an optical component configured to uniform light emitted by the LED light bar towards the lateral side of the transparent display panel.

In another embodiment, the optical component may comprise a light scattering component.

In a further embodiment, the optical structure may further comprise a brightness enhancement component.

In a still further embodiment, the first frame may comprise a frame body configured to fix the transparent display panel and a side plate located at an edge portion of the frame body and perpendicularly connected to the frame body; and the side plate is provided with at least one fixing part disposed adjacent to the frame body of the first frame or adjacent to the second frame and configured to fix an edge portion of the optical structure.

In a still further embodiment, the optical structure may be provided with a through-hole and the fixing part is passed through the through-hole of the optical structure such that the optical structure is mounted to the fixing part.

In a still further embodiment, the fixing part may be provided with a through-hole and the optical structure is passed through the through-hole of the fixing part to be mounted to the fixing part.

In a still further embodiment, the frame body may be provided with at least one first stopping part configured to limit a position of the optical structure within the transparent display device.

In a still further embodiment, the frame body may be provided with two first stopping parts and the optical structure is located between the two first stopping parts.

In a still further embodiment, the second frame may be provided with at least one second stopping part at an inner side thereof, and the second stopping part is disposed at a side of the optical structure adjacent to the transparent display panel.

In a still further embodiment, the second frame may be provided with two second stopping parts at the inner side thereof, and the optical structure is located between the two second stopping parts.

In a still further embodiment, the LED light bar may be fixedly provided on an inner side of the side plate.

In a still further embodiment, the transparent display device may further comprise an elastic light-shielding layer disposed between the edge region of the transparent display panel and at least one of the first frame and the second frame.

In a still further embodiment, the transparent display device may further comprise an adhesive layer located between the elastic light-shielding layer and the transparent display panel and an adhesive layer located between the elastic light-shielding layer and the at least one of the first frame and the second frame.

In a still further embodiment, the transparent display panel may be rectangular and each of four sides of the transparent display panel is provided with a LED light bar.

According to another aspect of the present disclosure, there is provided a transparent exhibition apparatus.

In an exemplary embodiment, the transparent exhibition apparatus may comprise: a transparent display device according to any one of the above embodiments; and an exhibition device disposed behind the transparent display device.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF EMBODIMENTS

Figure 1:
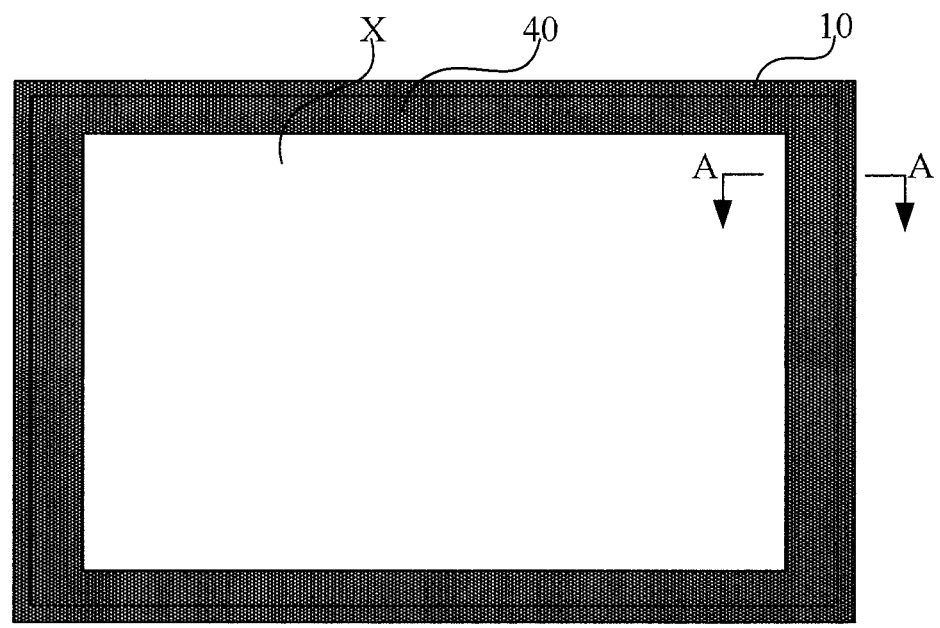
FIG. 1 is an illustrative drawing of a transparent display device according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
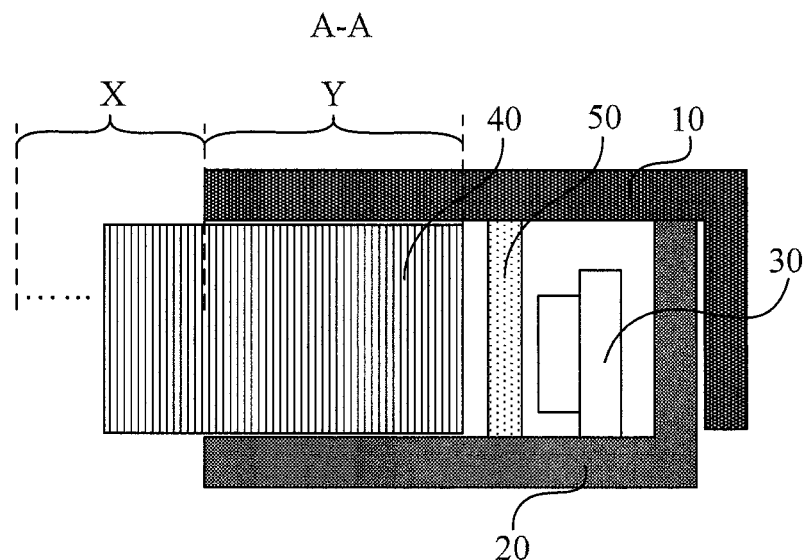
FIG. 2 is an illustrative partial cross-sectional view taken along line A-A of FIG. 1.

FIGS. 1 and 2 illustratively show a transparent display device according to an embodiment of the present disclosure. The transparent display device comprises a front frame 10, a rear frame 20, a transparent display panel 40, and a LED light bar 30 disposed on the rear frame 20. An edge region Y of the transparent display panel 40 is fixed between the front frame 10 and the rear frame 20. The front frame 10 and the rear frame 20 are provided with openings at their central portions, such that a transparent display region X of the transparent display panel 40 is exposed from the openings of the front frame 10 and the rear frame 20. An optical structure 50 is provided between a light emitting side of the LED light bar 30 and alight incoming side surface of the transparent display panel 40. The optical structure 50 comprises at least one optical component configured to uniform light. Light emitted by the LED light bar 30 passes through the optical structure 50 towards a lateral side of the transparent display panel 40.

The front frame 10 and the rear frame 20 may be fixed or assembled together in any suitable manner. For example, in the embodiment shown in FIG. 1, the top surface (i.e., upper surface) of a lateral plate of the rear frame 20 is abutted against the bottom surface (i.e., lower surface) of the front frame 10. Since the transparent display region X of the transparent display panel 40 is not shielded by the front frame 10 and the rear frame 20, an observer in front of the transparent display panel 40 can see the exhibit behind the transparent display panel 40. To be noted, terms "front frame" and "rear frame" used herein are only examples for the sake of convenience of description, and they maybe generally referred to as "first frame" and "second frame".

The LED light bar 30 extends in a direction perpendicular to the plane of the drawing and comprises a plurality of regularly arranged LED lamps and a circuit board for mounting the LED lamps. The circuit board may be fixed to the rear frame 20 or the front frame 10, and the light-emitting side of the LED light bar 30 faces the transparent display panel 40. Due to size error, assembling error and the like generated during manufacturing, the size of the LED light bar 30 may not perfectly match with the size of the transparent display panel 40, and the center of the LED light bar 30 may not be aligned with the center of the transparent display panel 40, therefore, light emitted by the LED light bar 30 and incident to the light incoming surface of the transparent display panel 40 has a poorer distribution uniformity, resulting in non-uniform distribution of light intensity inside the transparent display panel 40, such that brightness of a displayed picture is not uniform, and display effect is adversely affected. By providing the optical structure 50, which is configured to uniform light, between the LED light bar 30 and the transparent display panel 40, the light emitted from the LED light bar 30 is firstly uniformed by the optical structure 50, then transmitted to the transparent display panel 40, such that overall uniformity of the light transmitted to the transparent display panel 40 is improved.

Figure 3:
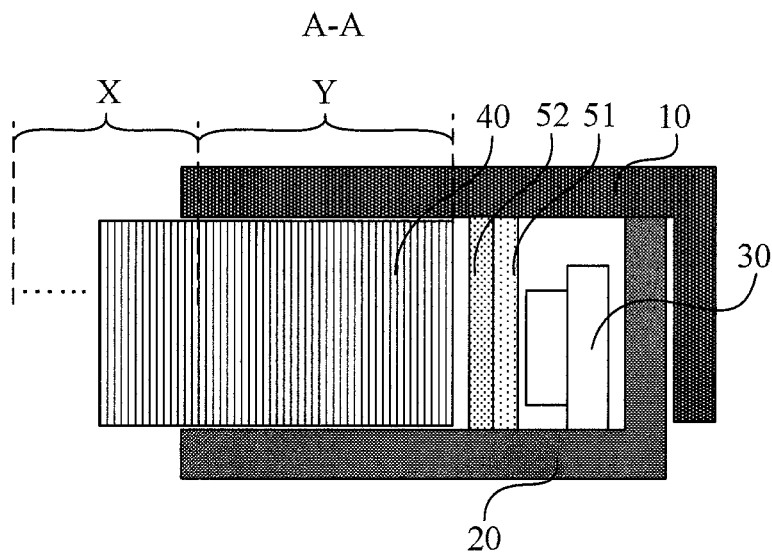
FIG. 3 is an illustrative partial cross-sectional view of a transparent display device according to an alternative embodiment to that shown in FIG. 2.

In an exemplary embodiment, as shown in FIG. 3, the optical structure 50 comprises a light scattering component 51.

Usually, the light scattering component 51 may be made through adding light scattering particles into a transparent substrate, therefore, when light passes through the light scattering component 51, propagation path of the light transmitted onto the light scattering particles is changed randomly, such that the light could be more uniform after passing through the light scattering component 51. Therefore, by providing the light scattering component 51 in the optical structure 50, light emitted by LED light bar 30 can be uniformed before being transmitted to the transparent display panel 40.

The substrate of the light scattering component 51 may be a flexible and thin film or a rigid film or sheet. In an embodiment, in order to facilitate fixing of the light scattering component 51 and reduce an influence on light scattering generated due to deformation of the light scattering component 51, the substrate is a rigid film or sheet.

In this embodiment, optionally, the optical structure 50 may also comprise a brightness enhancement component 52, as shown in FIG. 3.

By additionally providing the brightness enhancement component 52, the light emitted by the LED light bar 30 can be further brightened besides being uniformly scattered, such that utilization efficiency of the light source is improved. Similarly to the light scattering component 51, the brightness enhancement component 52 may be a flexible and thin film or a rigid film or sheet. In order to facilitate fixing of the brightness enhancement component 52 and reduce an influence on light scattering generated due to deformation of the brightness enhancement component 52, the brightness enhancement component 52 may be manufactured as a rigid film or sheet.

In the embodiment, as shown in FIG. 3, the light scattering component 51 and the brightness enhancement component 52 are disposed to abut against each other, so as to avoid any light loss otherwise caused by additional light reflection and refraction due to a gap between the light scattering component 51 and the brightness enhancement component 52.

As shown in FIG. 3, the light scattering component 51 is disposed at an upstream side of the brightness enhancement component 52 in a propagation direction of the light emitted by the LED light bar 30. However, in other embodiments, the light scattering component 51 may be disposed at a downstream side of the brightness enhancement component 52 in the propagation direction of the light emitted by the LED light bar 30.

Figure 4:
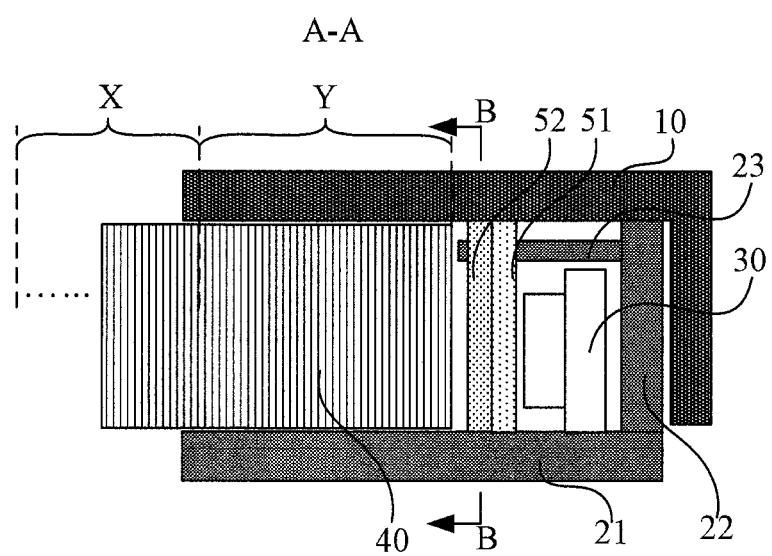
FIG. 4 is an illustrative partial cross-sectional view of a transparent display device according to another alternative embodiment to that shown in FIG. 2.

In a further exemplary embodiment, as shown in FIG. 4, the rear frame 20 comprises a rear frame body 21 disposed at a rear side of the transparent display panel 40 and a side plate 22 located at an edge region of the rear frame body 21 and perpendicularly connected to the rear frame body 21. The side plate 22 is provided with at least one fixing part 23, and the fixing part 23 is disposed adjacent to the front frame 10 and configured to fix an edge portion of the optical structure 50.

By providing the fixing part 23 configured for fixing the optical structure 50, vibration of the optical structure 50 within the transparent display device due to external factors can be restrained, such that a risk of damage due to collision between the optical structure 50 and the LED light bar 30 and collision between the optical structure 50 and the transparent display panel 40 can be decreased. Moreover, by disposing the fixing part 23 adjacent to the front frame 10 and fixing the edge portion of the optical structure 50, obstruction of light passing through the optical structure 50 and transmitted towards the transparent display panel 40 by the fixing part 23 can be reduced as much as possible, so that the influence on uniformity of light can be reduced. In other embodiments, the fixing part may also be disposed adjacent to the rear frame or mounted to the rear frame.

Figure 5:
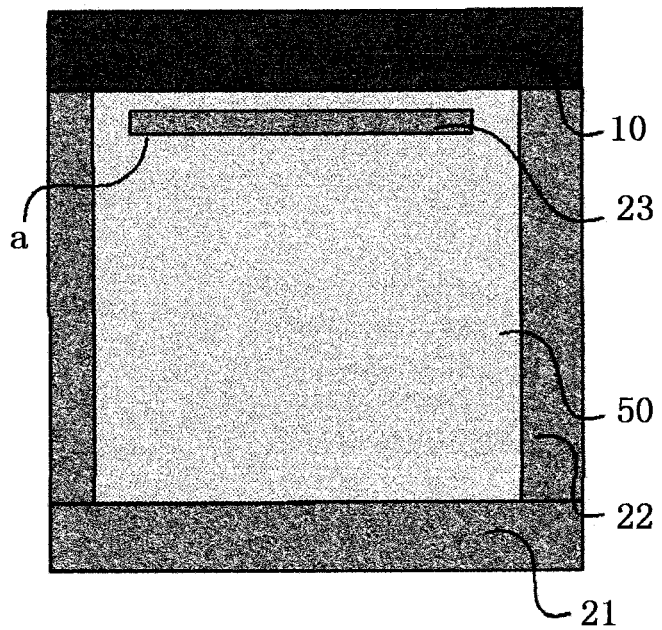
FIG. 5 is an illustrative cross-sectional view taken along line B-B of FIG. 4.
Figure 6:
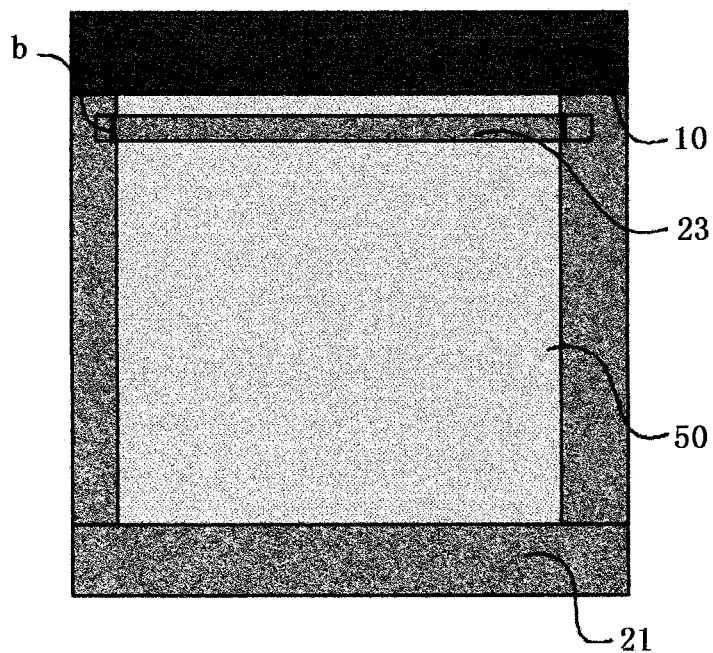
FIG. 6 is an illustrative cross-sectional view according to an alternative embodiment to that shown in FIG. 5.

The optical structure 50 may be fixed to the fixing part 23 by any suitable means, two examples of them are shown in FIGS. 5 and 6.

In the example shown in FIG. 5, the optical structure 50 is provided with a through-hole a, and the optical structure 50 is mounted to the fixing part 23 by passing the fixing part 23 through the through-hole a of the optical structure 50.

In the example shown in FIG. 6, the fixing part 23 is provided with a through-hole b, and the optical structure 50 is mounted to the fixing part 23 by passing the whole optical structure 50 through the through-hole b of the fixing part 23.

To be noted, the shape of the through-hole a of the optical structure 50 and the shape of the through-hole b of the fixing part 23 are not limited to the strip shape shown in FIGS. 5 and 6. The through-holes a and b may also be rectangular, circular or the like. The shape of the cross-section of the fixing part 23 is consistent with the shape of the through-hole a, or the shape of the cross-section of the optical structure 50 is consistent with the shape of the through-hole b.

Figure 7:
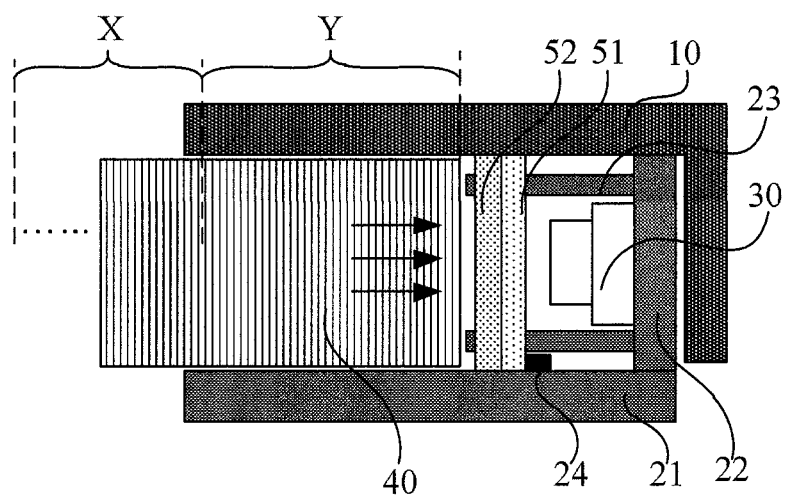
FIG. 7 is an illustrative partial cross-sectional view of a transparent display device according to a further alternative embodiment to that shown in FIG. 2.

In a further exemplary embodiment, as shown in FIG. 7, in the case of the side plate 22 being provided with two fixing parts 23, one fixing part 23 is disposed adjacent to the front frame 10 and the other fixing part 23 is disposed adjacent to the rear frame body 21, and the rear frame body 21 is provided with a stopping part 24 disposed at a side of the optical structure 50 adjacent to the LED light bar 30.

According to the embodiment shown in FIG. 7, the optical structure 50 (including the light scattering component 51 and the brightness enhancement component 52) may be moved in a direction indicated by the arrows of FIG. 7 such that the left end of the fixing part 23 passes through the through-hole a of the optical structure 50, then the optical structure 50 is further moved in the direction indicated by the arrows until the optical structure 50 abuts against the stopping part 24. In this condition, the optical structure 50 is moved to a predetermined position. By providing the stopping part 24, the position of the optical structure 50 in a thickness direction of the optical structure 50 may be determined and fixed, such that stability of the optical structure 50 in the thickness direction can be improved. In an example, after the optical structure 50 is mounted, the transparent display panel 40 is mounted, and then the front frame 10 is assembled.

Figure 8:
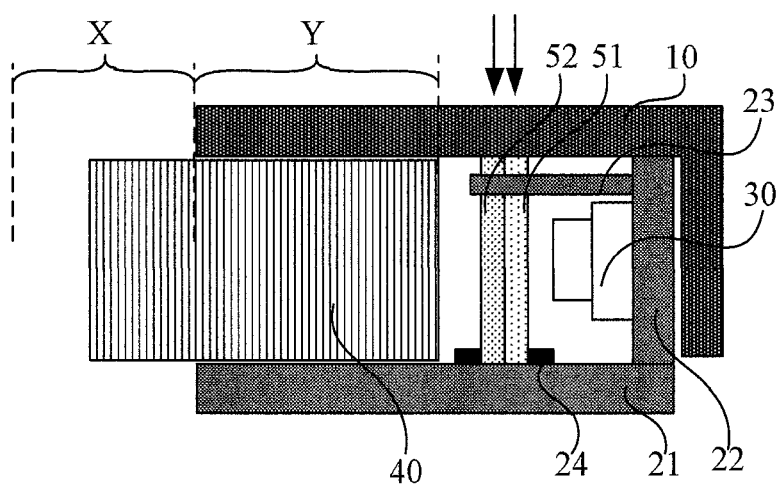
FIG. 8 is an illustrative partial cross-sectional view of a transparent display device according to a still further alternative embodiment to that shown in FIG. 2.
Figure 9:
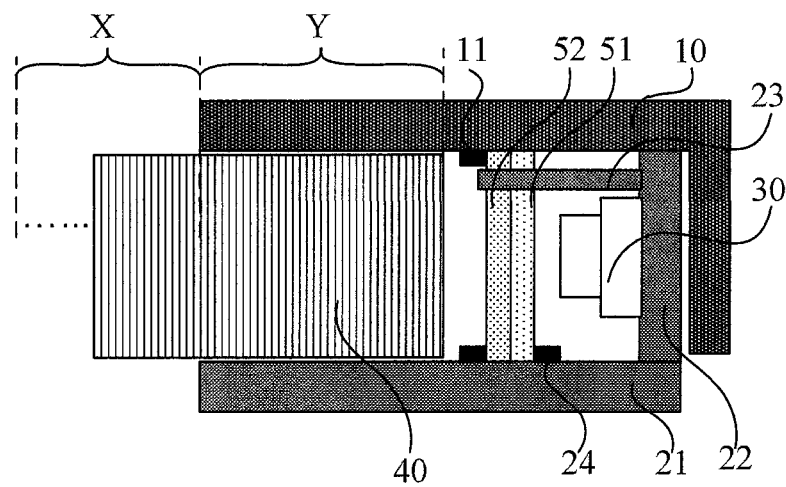
FIG. 9 is an illustrative partial cross-sectional view of a transparent display device according to a still further alternative embodiment to that shown in FIG. 2.
Figure 10:
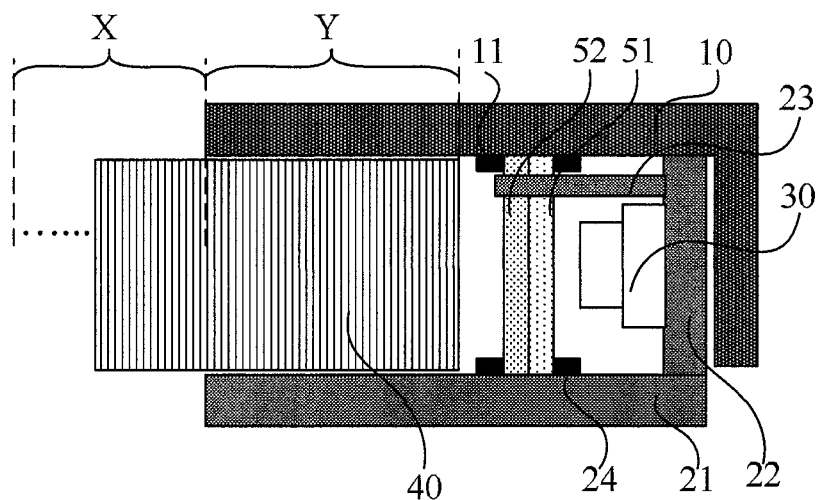
FIG. 10 is an illustrative partial cross-sectional view of a transparent display device according to a still further alternative embodiment to that shown in FIG. 2.

Different but similar implementations are anticipatable, for example, modified embodiments of the embodiment of FIG. 7 are shown in FIGS. 8-10.

In the embodiment shown in FIG. 8, only one fixing part 23 is provided at a position adjacent to the front frame 10, and the rear frame body 21 is provided with two stopping parts 24, the optical structure 50 is located between the two stopping parts 24. The left stopping part 24 shown in FIG. 8 may be mounted after the optical structure 50 is mounted in place. By providing the left stopping part 24, the optical structure 50 may be further constrained at a desired position.

In the embodiment shown in FIG. 9, the front frame 10 is also provided with a stopping part 11 at inner side thereof, and the stopping part 11 is provided at a side of the optical structure 50 adjacent to the transparent display panel 40.

In the embodiment shown in FIG. 10, the front frame 10 is provided with two stopping parts 11 at inner side thereof, and the optical structure 50 (including the light scattering component 51 and the brightness enhancement component 52) is located between the two stopping parts 11 of the front frame 10.

To be noted, the number of the stopping parts may be determined according to practical situation. For example, if the exhibition apparatus is used to exhibit during moving and internal components thereof need to be sufficiently fixed, then a plurality of stopping parts may be used.

In each of the embodiments shown in FIGS. 7-10, the LED light bar 30 is fixedly mounted at an inner side of the side plate 22, which may reduce the influence of the stopping parts 11 on the light emitted by the LED light bar 30. Moreover, in such manner, the LED light bar 30 can be arranged to correspond with the center of the light incoming side surface of the transparent display panel 40, such that uniformity of light emitted by the LED light bar 30 can be improved when the light is transmitted into the light incoming side surface of the transparent display panel 40.

In a further exemplary embodiment, as shown in FIG. 10, elastic light-shielding layers 60 are provided between the front frame 10 and the edge region Y of the transparent display panel 40 and between the rear frame 20 and the edge region Y of the transparent display panel 40, respectively.

In a further exemplary embodiment, there may be only one elastic light-shielding layer 60 provided between the front frame 10 and the edge region Y of the transparent display panel 40.

In a further exemplary embodiment, there may be only one elastic light-shielding layer 60 provided between the rear frame 20 and the edge region Y of the transparent display panel 40.

The elastic light-shielding layers 60 are made of non-transparent elastic material, which may prevent leakage of light between the transparent display panel 40 and the front frame 10 and/or between the transparent display panel 40 and the rear frame 20 from occurring, and provide elastic buffering between the transparent display panel 40 and the front frame 10 and/or between the transparent display panel 40 and the rear frame 20, so as to prevent damage caused by pressing and friction due to direct contacts between the transparent display panel 40 and the front frame 10 and/or between the transparent display panel 40 and the rear frame 20.

Figure 11:
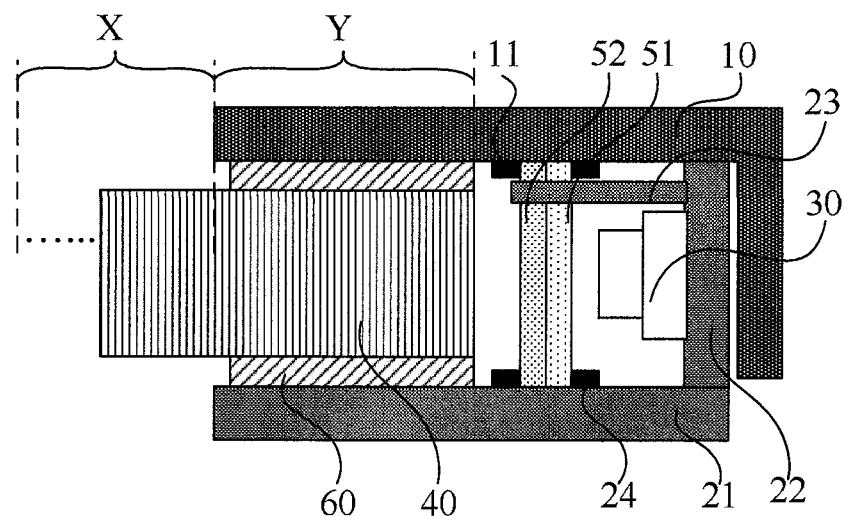
FIG. 11 is an illustrative partial cross-sectional view of a transparent display device according to a still further alternative embodiment to that shown in FIG. 2.

In a still further exemplary embodiment, as shown in FIG. 11, the elastic light-shielding layers 60 may be fixedly connected to the transparent display panel 40, the front frame 10 and the rear frame 20 by providing adhesive layers 70 at both sides thereof.

In a still further exemplary embodiment, the elastic light-shielding layers 60 may be fixedly connected to the transparent display panel 40 and the front frame 10 by providing adhesive layers 70 at both sides thereof.

In a still further exemplary embodiment, the elastic light-shielding layers 60 may be fixedly connected to the transparent display panel 40 and the rear frame 20 by providing adhesive layers 70 at both sides thereof. By providing the adhesive layer 70, a relative position of the transparent display panel 40 with respect to the front frame 10 and/or the rear frame 20 is further fixed, such that overall structural stability of the transparent display device can be improved.

To be noted, although only the structure of one side portion of the transparent display device is shown in the present disclosure, an ordinary skilled in the art would appreciate that the other three side portions of the transparent display panel 40 may each have a similar configuration.

By providing the LED light bar 30 and the optical structure 50 at each of four side portions of the transparent display panel 40, uniformity of light intensity distribution inside the transparent display panel 40 may be improved, and brightness uniformity of a displayed picture may thereby be improved.

Figure 12:
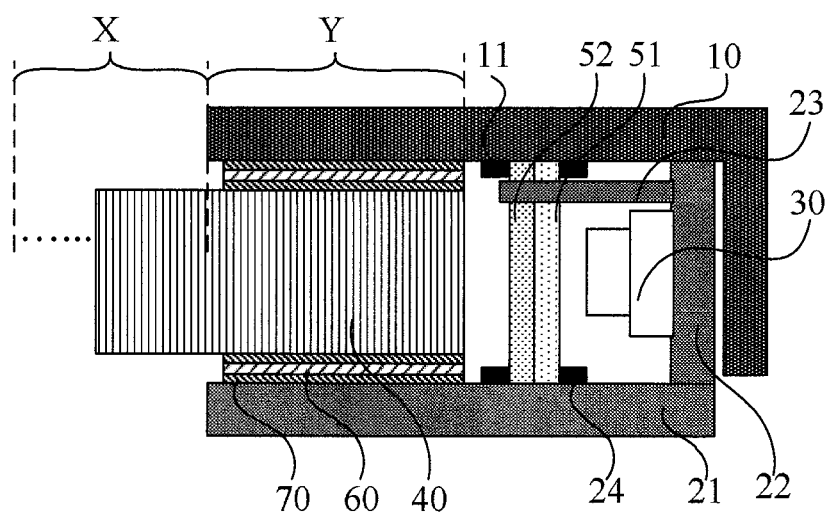
FIG. 12 is an illustrative partial cross-sectional view of a transparent display device according to a still further alternative embodiment to that shown in FIG. 2.
Figure 13:
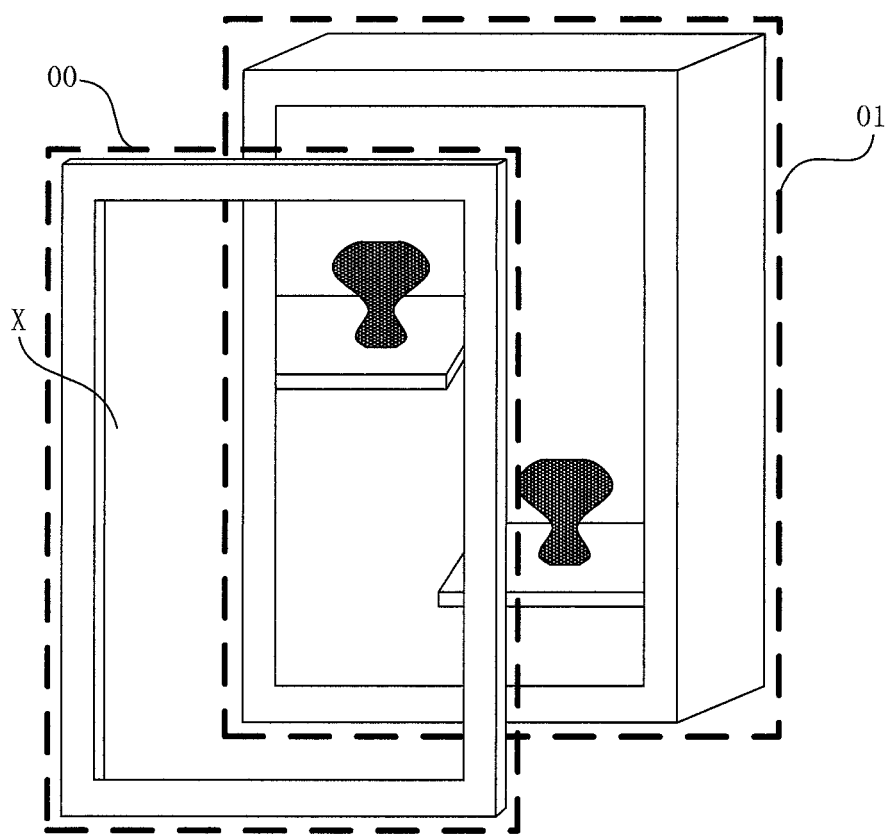
FIG. 13 is an illustrative drawing of a transparent exhibition apparatus according to an exemplary embodiment of the present disclosure.

According to another aspect of the present disclosure, there is also provided a transparent exhibition apparatus. As shown in FIG. 12, the transparent exhibition apparatus comprises a transparent display device 00 according to any one of above described embodiments and an exhibition device 01 located behind the transparent display device 00.

As shown in FIG. 12, an exhibit is disposed inside of the exhibition device 01, the transparent display device 00 is disposed in front of the exhibition device 01, an observer can see the exhibit inside the exhibition device 01 through the transparent display region X of the transparent display device 00, and at the same time, the transparent display device 00 may cooperatively display information or image (s) about the exhibit, such that the observer may obtain the information or image of the exhibit through the transparent display device during observing the exhibit, and overall exhibition effect can be improved.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A transparent display device, comprising:
   a first frame;
   a second frame;
   a transparent display panel, an edge region of the transparent display panel being fixed between the first frame and the second frame, each of the first frame and the second frame being provided with an opening at a central region thereof, such that a transparent display region of the transparent display panel is exposed from the opening of the first frame and the opening of the second frame;
   a LED light bar disposed at a lateral side of the transparent display panel; and
   an optical structure disposed between the lateral side of the transparent display panel and the LED light bar,
   wherein the optical structure comprises an optical component configured to uniform light emitted by the LED light bar towards the lateral side of the transparent display panel,
   wherein the optical structure comprises a brightness enhancement component.

2. The transparent display device according to claim 1, wherein the optical component comprises a light scattering component.

3. The transparent display device according to claim 1, wherein the first frame comprises a frame body configured to fix the transparent display panel and a side plate located at an edge portion of the frame body and perpendicularly connected to the frame body; and
   the side plate is provided with at least one fixing part disposed adjacent to the frame body of the first frame or adjacent to the second frame and configured to fix an edge portion of the optical structure.

4. The transparent display device according to claim 1, further comprising an elastic light-shielding layer disposed between the edge region of the transparent display panel and at least one of the first frame and the second frame.

5. The transparent display device according to claim 1, wherein the transparent display panel is rectangular and each of four sides of the transparent display panel is provided with a LED light bar.

6. A transparent exhibition apparatus, comprising:
   a transparent display device according to claim 1; and
   an exhibition device disposed behind the transparent display device.

7. The transparent display device according to claim 3, wherein the optical structure is provided with a through-hole and the fixing part is passed through the through-hole of the optical structure such that the optical structure is mounted to the fixing part.

8. The transparent display device according to claim 3, wherein the fixing part is provided with a through-hole and the optical structure is passed through the through-hole of the fixing part to be mounted to the fixing part.

9. The transparent display device according to claim 3, wherein the frame body is provided with at least one first stopping part configured to limit a position of the optical structure within the transparent display device.

10. The transparent display device according to claim 3, wherein the LED light bar is fixedly provided on an inner side of the side plate.

11. The transparent display device according to claim 4, further comprising an adhesive layer located between the elastic light-shielding layer and the transparent display panel and an adhesive layer located between the elastic light-shielding layer and the at least one of the first frame and the second frame.

12. The transparent exhibition apparatus according to claim 6, wherein the optical component comprises a light scattering component.

13. The transparent exhibition apparatus according to claim 6, wherein the first frame comprises a frame body configured to fix the transparent display panel and a side plate located at an edge portion of the frame body and perpendicularly connected to the frame body; and
   the side plate is provided with at least one fixing part disposed adjacent to the frame body of the first frame or adjacent to the second frame and configured to fix an edge portion of the optical structure.

14. The transparent exhibition apparatus according to claim 6, further comprising an elastic light-shielding layer disposed between the edge region of the transparent display panel and at least one of the first frame and the second frame.

15. The transparent display device according to claim 9, wherein the frame body is provided with two first stopping parts and the optical structure is located between the two first stopping parts.

16. The transparent exhibition apparatus according to claim 13, wherein the first frame or the second frame is provided with at least one first stopping part configured to limit a position of the optical structure within the transparent display device.

17. The transparent display device according to claim 15, wherein the second frame is provided with at least one second stopping part at an inner side thereof, and the second stopping part is disposed at a side of the optical structure adjacent to the transparent display panel.

18. The transparent display device according to claim 17, wherein the second frame is provided with two second stopping parts at the inner side thereof, and the optical structure is located between the two second stopping parts.

* * * * *